April 9, 1963 R. R. BOWER 3,084,782
VIBRATORY ORIENTING
Filed April 10, 1961 2 Sheets-Sheet 1
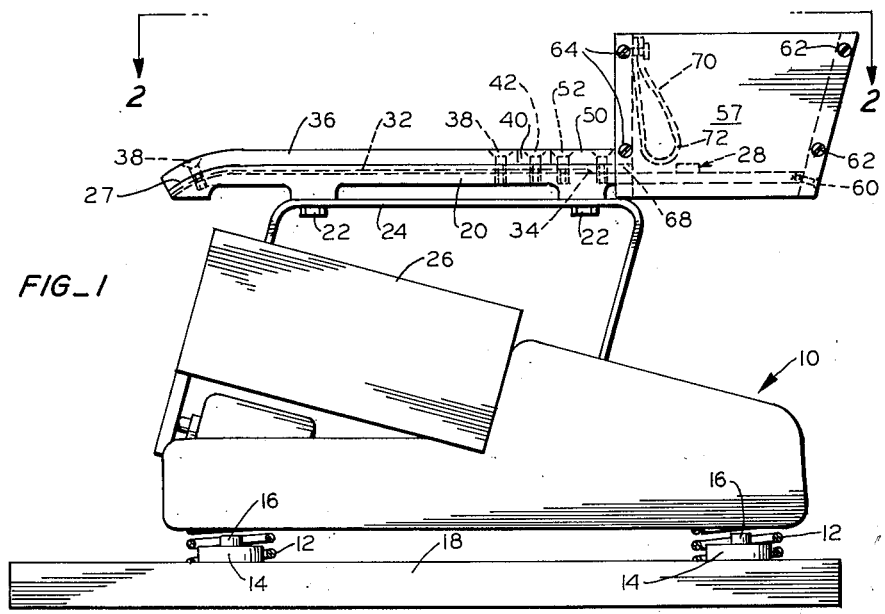
FIG_1
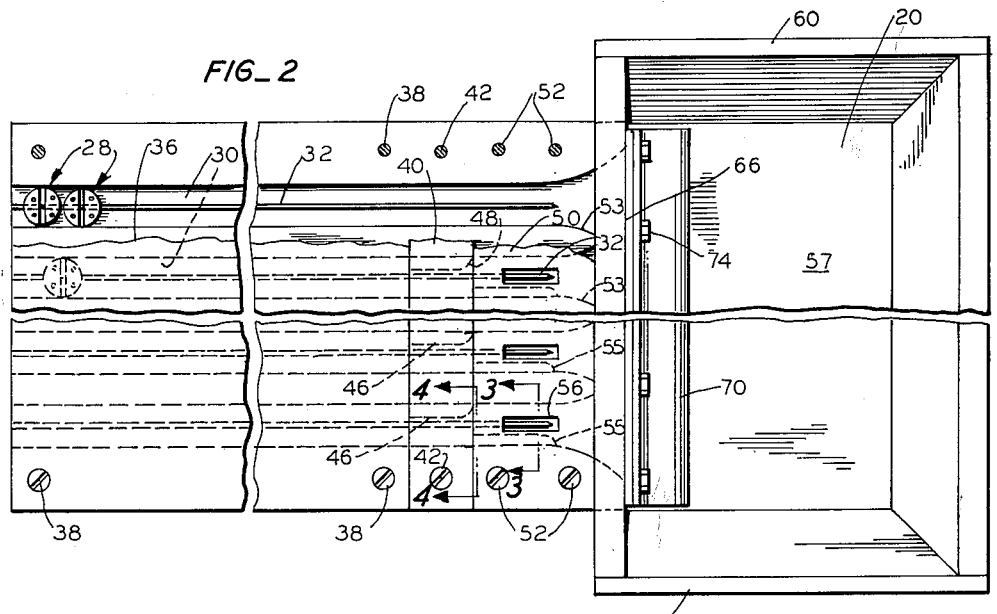
FIG_2
INVENTOR.
RICHARD R. BOWER
BY Christie, Parker & Hale
ATTORNEYS April 9, 1963 R. R. BOWER 3,084,782
VIBRATORY ORIENTING
Filed April 10, 1961 2 Sheets-Sheet 2
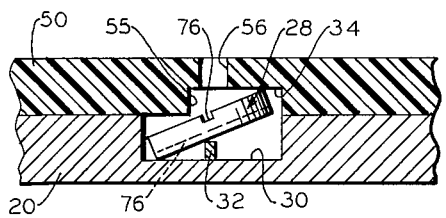
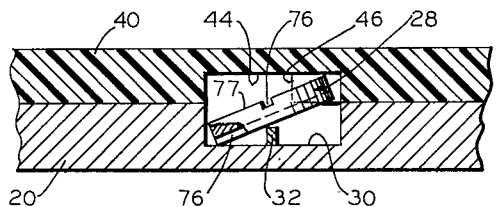
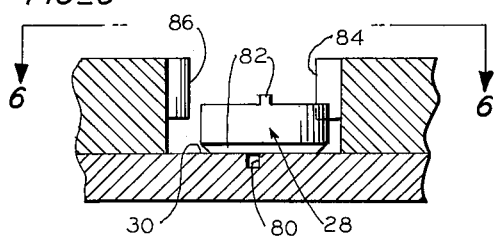
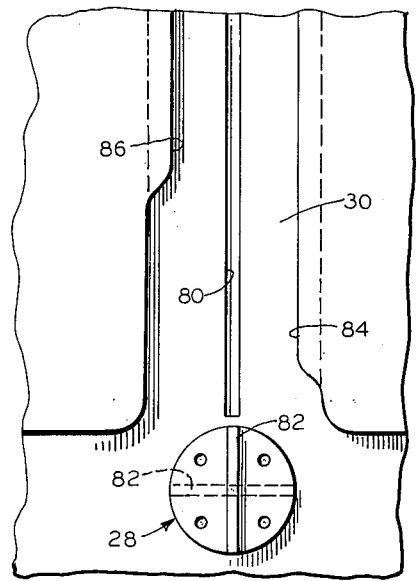
INVENTOR.
RICHARD R. BOWER
BY Christie, Parker & Hale
ATTORNEYS 3,084,782
VIBRATORY ORIENTING
Richard R. Bower, Palo Alto, Calif., assignor, by mesne assignments, to Raytheon Company, Lexington, Mass., a corporation of Delaware
Filed Apr. 10, 1961, Ser. No. 101,862
8 Claims. (Cl. 198—33)

This invention relates to vibratory feeders and articles to be oriented by such feeders.

In the manufacture and handling of large quantities of articles, it is often desirable to transfer and orient the parts automatically with vibratory feeders built to receive a batch of unoriented parts and feed them individually and sequentially in a uniform orientation.

Vibratory mechanisms of the prior art are not suitable for the rapid feeding and orientation of many parts used in various industries. A good example of such parts are glass and carbon disks used in the manufacture of transistors and the like. The disks are usually circular with flat opposed surfaces and holes extending through the disks to receive electrical leads. The disks have no protuberences to aid in orienting the holes for the subsequent automatic insertion of the electrical leads. Consequently, previously available vibratory feeders have not been satisfactory for automatically handling articles of this type.

This invention provides modified articles which previously were not readily susceptible to vibratory feeding and orientation, and vibratory apparatus for handling such articles.

Briefly, this invention contemplates article orienting apparatus which includes a base having an elongated channel in which articles are disposed. Means are provided for vibrating the articles to move them through the channel, which includes elongated guide means. Orienting guide means on each article are constructed and arranged to mate with the elongated guide means in the channel and maintain each article in a fixed orientation with respect to the direction of the channel as the articles move through it. Article turning means are disposed in the channel in the path of the articles to engage them as they move through the channel and rotate the articles to bring their orienting means into mating position with the elongated guide means in the channel.

Preferably, orienting guide means are formed at opposite sides of each of the articles so they can be properly oriented regardless of which side happens to be down as it enters the channel. In one form, the channel guide means is an elongated, raised ridge, and the orienting guide means on the articles are a pair of transverse guide grooves formed in opposite surfaces of each article. With this construction, the apparatus preferably includes means for engaging first one edge of the article to rotate the article in one direction and cause it to tilt downwardly on the side where it is engaged. Thereafter, the tilted article is engaged on an opposite edge and caused to rotate in the opposite direction until the groove on the bottom surface of the disk is rotated into alignment over the ridge in the bottom of the channel.

The articles are preferably fed into the channel from a hopper which has a discharge opening at the same level as the bottom of the hopper. A resilient flap is secured just over the bottom of the hopper adjacent the discharge opening to vibrate with the hopper and stir the articles to prevent them from jamming the hopper discharge opening.

These and other aspects of the invention will be more fully understood from the following detailed description taken in conjunction with the accompanying drawings in which:

FIG. 1 is a side elevation of the presently preferred embodiment of the invention;

FIG. 2 is a plan view taken on line 2—2 of FIG. 1;
FIG. 3 is a view taken on line 3—3 of FIG. 2;
FIG. 4 is a view taken on line 4—4 of FIG. 2;
FIG. 5 is a longitudinal cross section showing an alternate embodiment of the invention; and
FIG. 6 is a view taken on line 6—6 of FIG. 5.

Referring to FIGS. 1 and 2, a conventional vibrator 10, such as that sold under the tradename "Syntron" by the Syntron Company of Homer City, Pa., rests on springs 12 coaxially disposed around respective nesting pads or bosses 14 held by screws 16 to a foundation 18. An elongated substantially flat hopper base plate 20 is secured by screws 22 to the top of a vibrator bracket 24 which is vibrated through a relatively small amplitude at a fairly high frequency by a conventional electromagnetic vibrator assembly 26. As shown best in FIG. 1, the base plate slopes slightly downwardly toward the discharge (left) end of the hopper base. The discharge end is curved downwardly at 27 to facilitate the sliding of articles 28 off the discharge end of the plate.

As shown best in FIG. 2, the hopper base plate 20 has formed in its upper surface a plurality of elongated upwardly opening channels 30. A separate raised elongated guide ridge 32 extends along the bottom and centerline of each channel from the discharge end (left as viewed in FIGS. 1 and 2) to a point about two-thirds of the distance toward the opposite (right) end of the hopper base plate. The right end of each guide is tapered downwardly and rearwardly as shown best at 34 in FIG. 1.

A clear Plexiglas forward cover 36 is secured by screws 38 over the forward portion of the channels. A transverse bar 40, which also is preferably of a transparent material such as Plexiglas, is secured by screws 42 across the rear (right) edge of the forward cover and has its bottom surface shaped over each channel as shown in FIG. 4 so that a separate downwardly opening longitudinal recess 44 is centered to the left of ridge 32 and thereby forms a shoulder 46 which extends from the right side of the channel to just short of the ridge in the center of the channel. As shown best in FIG. 2, the rear face of the shoulder 46 is curved rearwardly and outwardly at 48 for a purpose described in detail below.

A rear cover plate 50 is secured by screws 52 over the rear ends of the channels, which have outwardly flaring rear openings 53 as shown best in FIG. 2.

As shown best in FIG. 3, the bottom of the rear cover plate 50 includes a separate downwardly opening longitudinal recess 54 which is offset to the right of a separate respective channel so that a shoulder 55 extends inwardly from the left side of the channel.

A separate longitudinal slot 56 opens through the rear cover plate over the rear end of each guide ridge 32 so that an operator can stick a wire or the like through the cover and break up any jamming of articles which might occasionally occur in this area.

A hopper 57 is formed on the rear end of the hopper base plate 20. The hopper includes an upwardly and rearwardly inclined rear wall 58 secured by screws 60 to the rear edge of the hopper base plate. Upwardly and outwardly extending hopper side walls 60 are secured by screws 62 to opposite edges of the hopper rear wall, and by screws 64 to opposite edges of a transverse vertical front hopper wall 66, which has a horizontal lower edge 67 that terminates above the channel openings 54 to form a hopper discharge opening 68. A rubber sheet 70 is folded over on itself to form a downwardly extending loop 72, which terminates just above and to the rear of the hopper discharge. The upper edges of the sheet are secured together and against the inside upper edge of the front hopper wall by screws 74. The hopper is filled with a batch of loose unoriented articles 28, which may be glass or carbon disks used in the manufacture of transistors.

As shown best in FIGS. 3 and 4, the disks 28 include elongated orienting mutually perpendicular guide grooves 76 in opposite circular and parallel flat faces 77. Four holes 78 extend through each disk to receive electrical leads (not shown).

In operation, the vibrator is turned on by conventional means so that the articles in the hopper are vibrated toward the hopper discharge. Any tendency for the articles to pile up or jam is prevented by the flap 70 which stirs the articles and keeps them one layer thick in the vicinity of the hopper discharge. The flap also prevents the articles from standing on edge.

As articles move into a channel opening 53, a few are properly oriented so the bottom groove 76 fits over a ridge 32. These articles pass through the entire length of the channel in the properly oriented manner. However, with most articles the downwardly opening orientation groove 76 is not aligned with the ridge 32. Therefore, as the disks move forward, they each travel up the inclined slope 34 at the rear end of the guide ridge 32. The shoulder 55 (FIG. 3) extending inwardly over the left side of the channel engages the leading left edge of each non-oriented disk and rotates it in counter-clockwise direction as viewed in FIG. 2. The shoulder 55 also forces the disk to tilt down on the ridge as shown in FIG. 3. The tilted disk continues to move forward and rotate counter-clockwise. If it should happen to assume an orientation which permits the groove 76 to slip down over the ridge 32, the disk then retains the orientation throughout the remainder of its travel in the channel. However, many of the disks remain non-oriented and tilted until they move forward and are contacted on their respective leading right, up-raised edges by the shoulder 46 which extends inwardly from the right side of the channel (FIG. 4). As the disks tend to move past the shoulder 46, they are rotated in a clockwise (as viewed from above) direction until the bottom orienting groove is aligned with the guide ridge 32. The disks then drop to a level position with the bottom orienting groove fitting over the ridge 32. The curved portion 48 of the shoulder 46 facilitates the rotation of the tilted disks for proper orientation.

Thus, with the arrangement just described, the disks are subject to positive and systematic movement which brings them into the desired orientation quickly and simply. The disks are then ready for further automatic handling, such as the insertion of electrical leads in the holes.

In the alternate arrangements shown in FIGS. 5 and 6, the channel 30 includes a longitudinal guide groove 80 instead of a raised ridge, and the disks 28 include mutually perpendicular, elongated raised ridges 82 instead of oriented grooves. The action is similar to that described in the embodiment shown in FIGS. 1 through 4. The disk 28 is vibrated to move through the channel and encounters a first rounded shoulder 84 on the right side of the channel. The disk is rotated in a clockwise direction (as viewed from above) and shifted slightly to the left of center as it moves past the first shoulder 84. The disk engages a second rounded shoulder 86 overhanging the left side of the channel 30. The disk is then rotated counter clockwise as it moves past the left shoulder so that the bottom orienting ridge 82 is aligned with the guide groove 80. The distance from the innermost edge of the shoulders to the center of the guide groove 80 is equal to the radius of the disk for minimum time required to achieve the desired orientation.

I claim:

1. Apparatus for orienting articles having orienting means on them, the apparatus including a hopper having a substantially flat bottom for holding a loose batch of the articles, means forming at least one elongated channel starting at an inlet end at the hopper bottom and extending away from the hopper, elongated guide means in the bottom of the channel to engage the orienting means on the articles, means for vibrating the articles over the flat bottom toward the inlet end of the channel so the articles are moved through the channel in contact with the elongated guide means, and means for rotating articles in the channel with orienting means not engaged by the elongated guide means in the channel so that the orienting means on the lower side of the unoriented article is brought into alignment with and engaged by the guide means in the channel.

2. Apparatus for orienting articles having orienting means on them, the apparatus including a hopper having a substantially flat bottom for holding a loose batch of the articles, means forming at least one elongated channel starting at an inlet end at the hopper bottom and extending away from the hopper, elongated guide means in the bottom of the channel to engage the orienting means on the artcles, means for vibrating the articles over the flat bottom toward the inlet end of the channel so the articles are moved through the channel in contact with the elongated guide means, and turning means extending into one side of the channel above the bottom of the channel and into the path of any advancing article with orienting means not engaged by the elongated guide means in the bottom of the channel so that one side of the unoriented article is contacted by the turning means to cause the said unoriented article to rotate and bring its orienting means into alignment with the guide means in the channel.

3. Apparatus for orienting articles having orienting means on them, the apparatus including a hopper having a substantially flat bottom for holding a loose batch of the articles, means forming at least one elongated channel starting at an inlet end at the hopper bottom and extending away from the hopper, elongated guide means in the bottom of the channel to engage the orienting means on the articles, means for vibrating the articles over the flat bottom toward the inlet end of the channel so the articles are moved through the channel in contact with the elongated guide means, first turning means extending into one side of the channel above the bottom of the channel and into the path of an advancing article with orienting means not engaged by the elongated guide means in the bottom of the channel so that one side of the unoriented article is contacted by the turning means to cause the said unoriented article to rotate and bring its orienting means into alignment with the guide means in the channel, and second turning means longitudinally spaced from the first turning means and extending into the other side of the channel above the bottom of the channel and into the path of an advancing article with orienting means not engaged by the elongated guide means.

4. Apparatus for orienting articles having orienting grooves on them, the apparatus including a hopper having a substantially flat bottom for holding a loose batch of the articles, means forming at least one elongated channel starting at an inlet end at the hopper bottom and extending away from the hopper, an elongated raised guide ridge in the bottom of the channel to engage the orienting grooves on the articles, means for vibrating the articles over the flat bottom toward the inlet end of the channel so the articles are moved through the channel in contact with the elongated guide ridge, and turning means extending into one side of the channel above the bottom of the channel and into the path of any advancing article with an orienting groove not engaged by the elongated guide ridge in the bottom of the channel so that one side of the unoriented article is contacted by the turning means to cause the said unoriented article to rotate and bring is orienting groove into alignment over the guide ridge in the channel.

5. Apparatus according to claim 3 in which the end of the guide ridge adjacent the inlet end of the channel tapers upwardly and away from the hopper.

6. Apparatus for orienting articles having orienting ridges on them, the apparatus including a hopper having a substantially flat bottom for holding a loose batch of the articles, means forming at least one elongated channel starting at an inlet end at the hopper bottom and extending away from the hopper, an elongated guide groove in the bottom of the channel to engage the orienting ridge on the articles, means for vibrating the articles over the flat bottom toward the inlet end of the channel so the articles are moved through the channel in contact with the elongated guide groove, and turning means extending into one side of the channel above the bottom of the channel and into the path of any advancing article with an orienting ridge not engaged by the elongated guide groove in the bottom of the channel so that one side of the unoriented article is contacted by the turning means to cause the said unoriented article to rotate and bring its orienting ridge into alignment with the guide groove in the channel.

7. Apparatus for orienting articles having orienting means on them, the apparatus including a hopper having a substantially flat bottom for holding a loose batch of the articles, means forming at least one elongated channel starting at an inlet end at the hopper bottom and extending away from the hopper, a flexible flap mounted over the hopper bottom at the entrance to the channel to keep the articles one layer thick at the inlet end of the channel, elongated guide means in the bottom of the channel to engage the orienting means on the articles, means for vibrating the articles over the flat bottom toward the inlet end of the channel so the articles are moved through the channel in contact with the elongated guide means, and turning means extending into one side of the channel above the bottom of the channel and into the path of any advancing article with orienting means not engaged by the elongated guide means in the bottom of the channel so that one side of the unoriented article is contacted by the turning means to cause the said unoriented article to rotate and bring its orienting means into alignment with the guide means in the channel.

8. Apparatus for orienting articles having orienting means on them, the apparatus including a hopper having a substantially flat bottom for holding a loose batch of the articles, means forming a plurality of elongated channels starting at respective inlet ends at the hopper bottom and extending away from the hopper, separate elongated guide means in the bottom of each channel to engage orienting means on the articles, means for vibrating the articles over the flat bottom toward the inlet ends of the channel so the articles are moved through the channels in contact with the respective elongated guide means therein, and separate turning means extending into one side of each channel above the bottom of the respective channel and into the path of any advancing article with orienting means not engaged by the elongated guide means in the bottom of the respective channel so that one side of the unoriented article is contacted by the turning means to cause the said unoriented article to rotate and bring its orienting means into alignment with the guide means in the respective channel.

References Cited in the file of this patent

UNITED STATES PATENTS

| | | |
|---|---|---|
| 2,369,785 | Kuehlman | Feb. 20, 1945 |
| 2,385,951 | Stelzer | Oct. 2, 1945 |

FOREIGN PATENTS

| | | |
|---|---|---|
| 210,342 | Austria | Dec. 15, 1959 |